United States Patent [19]

Lunt

[11] 3,882,027
[45] May 6, 1975

[54] RANDOM PACKING MEDIUM
[75] Inventor: John Lunt, Alderley Edge, England
[73] Assignee: Imperial Chemical Industries Limited, London, England
[22] Filed: Apr. 17, 1973
[21] Appl. No.: 352,037

[30] Foreign Application Priority Data
Apr. 24, 1972 United Kingdom............... 18823/72

[52] U.S. Cl.................... 210/500; 210/150; 261/94
[51] Int. Cl............................................. B01d 39/16
[58] Field of Search............ 210/17, 150, 151, 500, 210/66; 261/94, 95, 98

[56] References Cited
UNITED STATES PATENTS

| | | | |
|---|---|---|---|
| 3,266,787 | 8/1966 | Eckert | 261/94 |
| 3,430,934 | 3/1969 | Weishaupt | 261/94 |
| 3,543,937 | 12/1970 | Choun | 210/150 |
| 3,729,414 | 4/1973 | Harris et al. | 210/66 |

FOREIGN PATENTS OR APPLICATIONS

| | | | |
|---|---|---|---|
| 1,034,076 | 6/1966 | United Kingdom | 210/150 |

OTHER PUBLICATIONS

U.S. Stoneware Co., Bulletin PR–9, March 1960, the Pall Ring.
U.S. Stoneware Co., Bulletin TP–54, 1957, Tower Packings.
The American College Dictionary, 1970, Random House, pages 272-273.

Primary Examiner—Samih N. Zaharna
Assistant Examiner—Robert H. Spitzer
Attorney, Agent, or Firm—Cushman, Darby & Cushman

[57] ABSTRACT

A packing for biologically treataing waste water in a percolating filter comprising randomly packed extruded hollow cylindrical pieces of an organic polymeric material, the wall of each cylindrical piece being provided, throughout its length, as a plurality of corrugations which lie in planes which are transverse to or oblique to the main axis of the cylindrical piece.

9 Claims, 4 Drawing Figures

RANDOM PACKING MEDIUM

This invention relates to a process and plant for the treatment of liquid effluent and sewage hereinafter referred to as waste water.

Waste waters are treated by passing them through a biological filtration medium which carries on its contacting surfaces a growth of aerobic micro organisms. The growth of aerobic micro organisms establishes itself on the available surfaces within the filtration medium as the waste water passes through the filtration medium and effects a reduction of the biological oxygen demand of the waste water thereby converting it to a state which meets the standards laid down by the appropriate authorities.

Commonly the filtration medium used consists of randomly arranged pieces of coke, clinker, gravel, slag or rock. Filtration media of this type are retained within suitable walls which are mounted over air inlet and drainage channels. The air necessary for the oxidation process passes up from the air inlet channels through the spaces between the randomly packed pieces of the packing medium.

In the specification of our British Pat. No. 1,034,076 we have described and claimed a plant for biologically treating waste water in an aerated filter in which the packing medium comprises randomly packed pieces of an inert expanded polymeric material. In the specification we used the term expanded polymeric material to mean that the bulk polymeric material is in a modified form such that a large surface area is presented to the waste water which passes over it. The pieces of the inert expanded polymeric material may have a variety of shapes including rings and tubes.

Also in the specification of our British Pat. No. 1,082,661 we have described a process and plant for biologically treating waste water in an aerated filter in which the waste water may be passed intermittently through a packing medium comprising pieces of an inert expanded polymeric material having a large number of cavities.

Whilst a filtration media comprising randomly packed pieces of an inert expanded polymeric material having the shape of a small thin-walled cylinder will provide an adequately large surface area for most purposes, the wall thickness of such cylinders will have to be such that the cylinders are capable of withstanding the compressive forces existing in the filtration media. It will be realised that in the lower regions of the filtration media the compressive forces imposed on the pieces will be very high because, apart from having to support the pieces located above them, a considerable weight of aerobic micro-organic growth will have to be supported, as high as 3.3 kg/metre$^2$ of surface area available and the weight of the waste water itself will be considerable.

We have now found that by imparting a plurality of grooves or corrugations to the wall of such a cylinder, the rigidity of the cylinder is so greatly increased that cylinders having very thin walls can be used as a filtration medium for treating waste water.

According to the present invention, therefor, a packing medium for biologically treating waste water in an aerated filter comprises cylindrical pieces of an inert organic polymeric material, the walls of the cylindrical pieces being corrugated.

In preference the packing medium of the invention is a cylindrical piece in which the wall of the cylinder is corrugated and terminates in planes which are transverse to the main axis of the cylinder.

Alternatively, however, the wall of the cylindrical piece may terminate in planes which are oblique to the main axis of the cylinder. In this case we prefer that the wall of a cylindrical piece terminates, at each end of a cylindrical piece, in planes which are inclined at an angle in the range 85° to 65°, and more preferably 85° to 75°, to the main axis of the cylindrical piece. A corrugated cylinder having ends which are oblique to the main axis of the cylinder has been found to pack more randomly and wetted more readily after being randomly packed than a corrugated cylinder having ends which lie in planes at right angles to the main axis of the cylinder. Even so, such cylinders are generally more difficult and expensive to produce and so, in an art where cost is all important, those cylinders which terminate in planes which are transverse to the main axis of the cylinder are preferred.

Though the cylindrical pieces may be longitudinally corrugated, we prefer that they are transversely corrugated. Cylinders with plain walls have a greater compressive strength in the direction along the main axis than across the main axis and the formation of transverse corrugations increases the compressive strength across the main axis albeit at the expense of strength along the main axis, the degree being dependent on depth and frequency of the corrugations. In a filter bed or tower, some compression along the main axis is acceptable whereas compression across the main axis may lead to blockage of the filter by accumulation of solids.

In a further embodiment of the invention, the wall of the cylindrical piece is provided with a plurality of corrugations which lie in planes which are oblique to the main axis of the cylindrical piece. In the case when the wall of the cylindrical piece terminates in parallel planes which are oblique to the main axis, then conveniently the corrugations lie in planes which are parallel to those planes in which the wall of the cylindrical piece terminates.

We also include in the present invention a plant for biologically treating waste water in an aerated filter in which the packing medium comprises randomly packed cylindrical pieces of an inert organic polymeric material, the walls of the cylindrical pieces being corrugated in a transverse, oblique or longitudinal direction.

In such a plant, the flow of waste water through the aerated filter may be continuous. Alternatively, the flow may be intermittent. Conveniently, the waste water is distributed intermittently over the aerated filter by means of a rotary spray arm.

Whilst the diameter and length of the cylindrical pieces may be of the same order of magnitude we prefer that the length of a cylindrical piece is less than its diameter. This has the advantage that it reduces the likelihood of blocking occurring between adjacent pieces in the filter and, in addition, reduces the chance of pieces in the lower region of the biological filter adopting positions such that their main axes are horizontal which might interfere with flow of waste water through the filter and lead to less complete utilisation of available surface and impair satisfactory ventilation of the filter.

In practice, a suitable diameter and length can be selected in the range 1 cm to 10 cms. However, it should be understood that the present invention is not restricted to dimensions in this range and cylindrical pieces having a diameter and length outside this range may, in certain circumstances, be used.

We have mentioned above that because of their improved rigidity, the corrugated cylindrical pieces having very thin walls can be used as a biological filtration medium. In general a suitable wall thickness can be selected in the range 0.1 mm to 2 mm.

The pitch and depth of the corrugations in the wall of the cylindrical pieces may have any suitable dimensions. Also the corrugations in the wall of the cylindrical pieces may have any suitable profile. It will, of course, be understood that the pitch, depth and profile of the corrugations will be dependent somewhat on the diameter, length and wall thickness of the cylindrical pieces. With the preferred sizes for diameter and length mentioned above, a suitable pitch can be selected in the range 1 mm to 10 mms. Furthermore, a suitable depth can be selected in the range 1 mm to 20 mms. Also, conveniently, the corrugations in the wall of the cylindrical pieces have a profile resembling a sine curve or of castellated form.

Apart from the walls of the cylindrical pieces being provided as corrugations, the walls may be perforated at a number of positions to reduce the likelihood of the internal surfaces of a particular cylindrical piece not being wetted by the waste water. The perforations so provided may have any suitable shape, for example they may be circular, rectangular, cross-like or of irregular configuration. Also the perforations may have any suitable size bearing in mind that the perforations should not reduce the rigidity of the cylindrical pieces unduly.

Though we have said that the cylindrical pieces may be, and preferably are, transversely corrugated we wish to include within this expression the case when the wall of the cylindrical piece is provided as a continuous, thread-like, corrugation extending around and along the cylinder.

Suitable inert polymeric materials for use in the manufacture of these pieces include polyvinyl chloride, polystyrene, polyethylene, polypropylene and polyamide resins. Certain polyester resins, acrylic resins and cellulose derivatives which are sufficiently inert to the particular waste water can also be used. These polymeric materials may be used in the cellular form to reduce cost without reducing rigidity.

The cylindrical pieces may be produced in any suitable manner. Conveniently the polymeric material is extruded through a suitable die to produce a continuous tube having an uncorrugated wall, the wall of the tube then being deformed by a suitable moulding device to provide transverse or oblique corrugations in the wall. The transversely or obliquely corrugated tube is optionally perforated at several positions before being cut up into a plurality of short cylindrical pieces. Alternatively the cylindrical pieces may be produced by injection moulding.

An advantage of the new packing media over conventional random packing media is that it has a lower bulk density than conventional random media. Consequently the structure of a purification plant employing the new media, and hence its cost, can be reduced. The weight reduction which can be achieved by employing our new packing medium also makes easier the construction of taller purification plants which can offer a substantial saving in ground area in congested industrial areas and other places in which land is at a premium. Also the packings will accept high hydraulic loads due to their higher voidage compared with stone, clinker, etc.

Of more significance is the high rigidity offered by the corrugated cylindrical packing media of the invention. As an indication of the order of rigidity which can be achieved, a 51 mm diameter, 51 mm long, extruded plain cylinder of rigid polyvinyl chloride having a wall thickness of 0.4 mm required a load (at 20°C) of 0.2 Newton applied along the upper surface parallel to the main axis to give an instantaneous deflection of 1% across the axis of the cylinder. A transversely corrugated cylinder of rigid polyvinyl chloride of the same dimensions but with sine wave corrugations of depth 2.5 mm x pitch 4 mm required a load of 18 Newtons to give the same deflection. As a further comparison a plain cylinder of rigid polyvinyl chloride of the same diameter and length but of 2 mm wall thickness required a load of 22 Newtons to give the same deflection.

A plain wall cylinder of the same dimensions but fabricated from expanded polyvinyl chloride of 60 percent degree of expansion and of wall thickness 1 mm showed a deflection of 1 mm under a load of 2 Newtons.

In each case, loads required to give the same deflection when applied in the same direction as the main axis were much higher.

It is evident that the use as a biological filtration medium, of corrugated cylinders instead of plain cylinders of equivalent resistance to crushing will considerably reduce the overall cost of the aerated filter.

Also using randomly packed transversely corrugated cylindrical pieces of a rigid organic polymeric material, a high biological efficiency can be obtained when treating waste water.

The drawings illustrate exemplary grooved cylindrical packings according to the present invention wherein.

Figure 1:
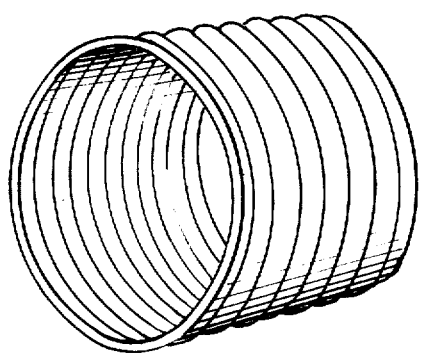
FIG. 1 is a perspective view of an exemplary packing according to the invention having sine wave corrugations located in planes which are transverse to the main axis of the cylinder.
Figure 2:
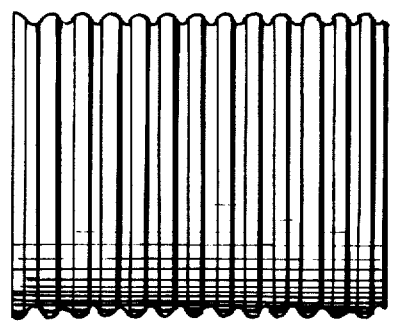
FIG. 2 is a side view of the cylinder shown in FIG. 1.
Figure 3:
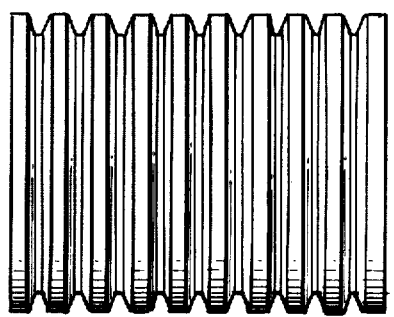
Figure 4:
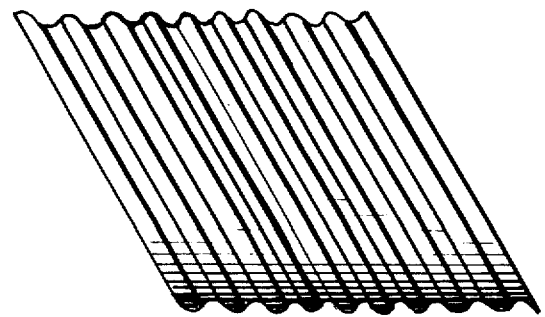

FIG. 3 is a side view of an exemplary packing according to the invention having castellated corrugations located in planes transverse to the main axis of the cylinder; and FIG. 4 is a side view of an exemplary packing according to the invention having castellated corrugations located in planes oblique to the main axis of the cylinder, the cylinder terminating in planes which are oblique to the main axis and parallel to the planes of the corrugations.

The invention will now be described with reference to the following Example:

EXAMPLE

In this Example, the filter medium used were randomly packed cylindrical pieces of polyvinyl chloride. The pieces had an outside diameter of 34 mms and a length of 38 mms. The wall thickness was 0.40 mms and the wall terminated in planes which were transverse to the main axis of the cylinders. The walls were transversely corrugated, the corrugations being individual and having a pitch of 3 mms, a depth of 2 mm and having a castellated form.

The cylindrical pieces were randomly dumped into a square section tower which was 6 ft. deep and had a 16 ft.² cross section.

The filter so formed was used to treat domestic effluent which had been subjected to a primary biological treatment process followed by primary settlement. In the process of the invention the effluent flowed over the surfaces of the cylindrical pieces and bacteria and other micro-organisms grew as a slimy film on the wetted surfaces of the pieces by feeding on the organic impurity absorbed from the effluent. In time a balanced community or organisms developed on the wetted surfaces within the filter.

When a balanced state was reached, the filter was capable of removing 90 percent BOD (bio-chemical oxygen demand) from a domestic effluent feed having a mean BOD of 197 mg/litre which was fed intermittently to the filter at a hydraulic load of 1.73 m³/m³/day.

A similar filter was assembled which in the balanced state was capable of removing 81 percent BOD from a domestic effluent feed having a mean BOD of 176 mg/litre which was fed continuously to the filter at a hydraulic load of 3.5 m³/m³/day.

What I claim is:

1. A packing for biologically treating waste water in a percolating filter comprising randomly packed extruded hollow cylindrical pieces of an organic polymeric material, the wall of each cylindrical piece being provided, throughout its length, as a plurality of corrugations which lie in planes which are transverse to or oblique to the main axis of the cylindrical piece, each of said corrugations in the wall of each cylindrical corrugated piece having a depth in excess of the thickness of the wall.

2. A packing as claimed in claim 1 in which the wall of each extruded hollow cylindrical piece is provided, throughout its length, as a plurality of corrugations which lie in planes which are transverse to the main axis of the cylindrical piece, the wall of the hollow cylindrical piece terminating in planes which are transverse to the main axis of the cylindrical piece.

3. A packing as claimed in claim 1 in which the wall of each extruded hollow cylindrical piece is provided, throughout its length, as a plurality of corrugations which lie in planes which are oblique to the main axis of the cylindrical piece, the wall of the hollow cylindrical piece terminating in planes which are parallel to those planes in which the corrugations lie.

4. A packing as claimed in claim 3 in which the said planes are inclined at an angle in the range 85° to 65° to the main axis of the hollow cylindrical piece.

5. A packing as claimed in claim 3 in which the said planes are inclined at an angle in the range 85° to 75° to the main axis of the hollow cylindrical piece.

6. A packing as claimed in claim 1 in which the wall of each cylindrical piece has a thickness in the range 0.2 mm to 2 mm.

7. A packing as claimed in claim 1 in which both the diameter and length of each cylindrical piece is in the range 1 cm to 10 cm.

8. A packing as claimed in claim 1 in which the corrugation provided in the wall of a corrugated piece has a pitch selected in the range 16 mm to 10 mm.

9. A packing as claimed in claim 1 in which the corrugation provided in the wall of a corrugated piece has a depth selected in the range 1 mm to 20 mm.

* * * * *